United States Patent
Crisinel et al.

(10) Patent No.: US 6,722,314 B1
(45) Date of Patent: Apr. 20, 2004

(54) METHOD FOR IMPROVING CONDITIONS IN CLOSED CIRCUIT FISH FARMING

(75) Inventors: Pascal Crisinel, Guyancourt (FR); Lucie Prost, Paris (FR); Lionel Bon, Noirmoutier (FR)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/979,504

(22) PCT Filed: Apr. 17, 2000

(86) PCT No.: PCT/FR00/00993

§ 371 (c)(1), (2), (4) Date: Feb. 25, 2002

(87) PCT Pub. No.: WO00/70943

PCT Pub. Date: Nov. 30, 2000

(30) Foreign Application Priority Data

May 25, 1999 (FR) .............................. 99 06567

(51) Int. Cl.$^7$ .............................................. A01K 63/04
(52) U.S. Cl. .................. 119/226; 119/200; 119/211; 119/245; 119/259
(58) Field of Search ................. 119/226, 200, 119/211, 227, 245, 259, 260, 261, 262; 210/416.2

(56) References Cited

U.S. PATENT DOCUMENTS

| | | | | |
|---|---|---|---|---|
| 4,052,960 A | * | 10/1977 | Birkbeck | 119/3 |
| 4,517,084 A | * | 5/1985 | Pincon | 210/169 |
| 4,559,902 A | * | 12/1985 | Mason et al. | 119/2 |
| 5,732,654 A | * | 3/1998 | Perez et al. | 119/204 |
| 5,893,337 A | * | 4/1999 | Sevic | 119/215 |
| 5,961,831 A | * | 10/1999 | Lee et al. | 210/614 |
| 6,382,134 B1 | * | 5/2002 | Gruenberg et al. | 119/215 |

FOREIGN PATENT DOCUMENTS

| | | | | |
|---|---|---|---|---|
| DE | 3031492 A1 | | 4/1982 | |
| DE | 3827716 A1 | | 3/1990 | |
| JP | 53-132495 | | 11/1978 | |
| JP | 403188999 A | * | 12/1989 | C02F/7/00 |
| JP | 3-180132 A | | 8/1991 | |
| JP | 406046719 A | * | 2/1994 | A01K/63/04 |
| WO | WO89/05578 | | 6/1989 | |

OTHER PUBLICATIONS

Search Report issued in International Application No. PCT/FR00/00993, issued Apr. 31, 2000.

* cited by examiner

Primary Examiner—Peter M. Poon
Assistant Examiner—Andrea Valenti
(74) Attorney, Agent, or Firm—Burns, Doane, Swecker & Mathis, L.L.P.

(57) ABSTRACT

The invention relates to a method for improving conditions in closed circuit seafood and fish farming, comprising the following steps: a) at least part of the water from at least one of the rearing ponds (1) is recycled, whereby said water is treated one or more times and purified (3, 4, 5) before it is re-injected into said pond; b) the water recycled during the recycling path indicated in step a) is mixed with a new supply of water (10); c) all or part of the recycled water (21, 22) undergoes ozonization and, wherever applicable, the new supply of water (20) also undergoes ozonization either partially or in full before it is mixed with the re-circulated water.

50 Claims, 5 Drawing Sheets

METHOD FOR IMPROVING CONDITIONS IN CLOSED CIRCUIT FISH FARMING

BACKGROUND OF THE INVENTION

1. Field of the Invention

The present invention relates to the field of aquaculture, in particular but not exclusively in seawater, an industrial sector in full development, especially for the production of sea bass, sea bream and turbot.

It is aimed in particular at closed circuit fish farming.

2. Description of the Related Art

Considering here the case of seawater fish farming, it is in fact known that seawater fish farms operate in an open circuit discharging very large quantities of contaminated water. Typical quantities of water needed and discharged are assessed at about 200 to 300 m³ water/kg of fish produced. It is then understood that depending on the site at which such farms are installed, increasing environmental constraints are now tending to require the treatment of discharged waters, or even an absolute limit on the amount of water discharged.

Such a technique of farming seawater fish in a closed circuit (where at least part of the seawater of the rearing pond or ponds is therefore recycled in order to purify it and reinject it into the pond in question), is unquestionably an emerging technique in full development, even if its control is, in practice, very difficult and precise since it requires specific treatments to control the pH, the oxygen content, the $CO_2$ content, the microbial and particulate load, the nitrogen load (especially aqueous ammonia), the dissolved contaminants, or even the color of the water in the ponds.

The fact remains that depending on the fish farmers, the control of this technique of closed circuit farming may enable, depending on the case, from 10 to 95 or even 98% of the seawater to be recycled, the rest being provided by new seawater makeup.

Nevertheless, it appears in practice, that although closed circuit water treatment circuits, which are quite complex, make it possible to control effectively parameters such as the pH, dissolved gases or even the microbial load of the recycled water (use of mechanical filters, of biological filters, of degassing columns, etc.), other problems are not yet truly resolved. Among these technical problems, which constitute real thorns in the life of these aquaculture plants, there is the problem of water coloration.

Specifically, the appearance of a yellow coloring of the water is observed, particularly at high recirculation rates (above 80%), which limits the visibility and unquestionably leads to stress in the farmed species.

Undoubtedly, the nature of these substances has not really been identified to date, but some works incline by towards the intervention of humic acids in this phenomenon. It is then found that no technology has really been validated in the current literature in order to resolve this problem, a problem which is most often termed "yellow water", UV light in particular having no effect on this color phenomenon.

SUMMARY OF THE INVENTION

One of the objects of the present invention is then especially to provide a method making it possible to improve the conditions in closed circuit fish farming, whether it involves seawater fish or freshwater fish or other sea products, aiming especially to demonstrate, on the phenomenon described above, a curative effect (in order to substantially remove the substances which would already have accumulated) and a preventive effect (in order to substantially limit the appearance of these coloring substances), while of course maintaining conditions acceptable for the farmed species in terms of toxicity and microbiology.

To simplify the terminology, in the following, the term "fish" will be used in the knowledge that it covers, according to the invention (unless otherwise specified) fish, eggs, seawater or freshwater young fish, or even sea products such as shellfish and mollusks.

The invention therefore relates to a method for improving conditions in closed circuit fish farming, in which:

a) at least part of the water of at least one rearing pond is recycled, recycled water which undergoes one or more purification treatments, before being reinjected into the pond in question;

b) in the recycling path of step a), the recycled water is mixed with new water makeup;

c) ozonation of all or part of the recycled water is carried out and in addition, if necessary, ozonation of the new water makeup is carried out before mixing it in step b.

The method for improving farming conditions according to the invention will also adopt one or more of the following characteristics:

the mixing of the recycled water and the new water makeup is carried out in a retention tank;

the new water makeup is ozonated by injecting a gas comprising ozone, so as to obtain an ozone content in the water of between 1 and 15 mg ozone/liter, and more preferably, between 2 and 10 mg ozone/liter of water;

the recycled water which is ozonated is ozonated by injecting a gas comprising ozone, so as to obtain an ozone content in the recycled water of between 0.05 and 2 mg ozone/liter, and more preferably between 0.1 and 1 or even 0.5 mg ozone/liter of recirculated water;

ozonation of all or part of the recirculated water and of the new water makeup is carried out;

the recycling path comprises a purification treatment using a biological filter, and the gas comprising ozone is then injected upstream of this biological filter;

the recycling path comprises a purification treatment using a biological filter, and the gas comprising ozone is then injected downstream of this biological filter, before the recirculated water is mixed with the new water makeup;

ozonation of all or part of the recirculated water and of the new water makeup is carried out, and two ozonators are available for this purpose so that each prepares one of the two ozonation gases needed;

ozonation of all or part of the recirculated water and of the new water makeup is carried out, and a single ozonator is available for this purpose, operating according to the following procedures:

i) said ozonator produces a main flow of ozonated gas;

j) a predetermined portion of the main flow of ozonated gas is diverted to a calibrated orifice, in order to direct it toward the recirculated water stream to be ozonated;

k) the power of said ozonator is adjusted on the basis of the flow rate of new water to be ozonated.

ozonation of all or part of the recirculated water and of the new water makeup is carried out, and a single ozonator is available for this purpose, operating according to the following procedures:

i) said ozonator supplies a main flow of ozonated gas;
j) a predetermined portion of the main flow of ozonated gas is diverted through a calibrated orifice, in order to direct it toward the new water to be ozonated;
k) the power of said ozonator is adjusted on the basis of the flow rate of recirculated water to be ozonated.

the improved fish farming is closed circuit farming of seawater fish.

The invention also relates to a method for decoloring the water of a closed circuit fish farm, a farm of the type where at least part of the water of at least one rearing pond is recycled, recycled water which undergoes one or more purification treatments before being reinjected into the pond in question, while in the recycling path, the recycled water is mixed with new water makeup in a retention tank, characterized in that the ozonation of all or part of the recirculated water, and also if necessary the ozonation of the new water makeup, is carried out before it is mixed with the recycled water.

The decoloration method according to the present invention must be understood as aiming in particular to limit the phenomenon of the appearance of yellow water, and to substantially eliminate the substances which would have accumulated beforehand.

The decoloration method according to the invention will moreover be able to adopt one or more of the following characteristics:

mixing of the recycled water and the new water makeup is carried out in a retention tank;
  the new water makeup is ozonated by injection of a gas comprising ozone, so as to obtain an ozone content in the water of between 1 and 15 mg ozone/liter, and more preferably between 2 and 10 mg ozone/liter of new water, while the recirculated water is ozonated by injection of a gas comprising ozone so as to obtain an ozone content in the recirculated water of between 0.05 and 2 mg ozone/liter, and more preferably between 0.1 and 0.5 mg ozone/liter of recirculated water;
  the recycling path comprises a purification treatment using a biological filter, and the ozonated gas is then injected upstream of this biological filter;
  the recycling path comprises a purification treatment using a biological filter, and the ozonated gas is then injected downstream of this biological filter, before the recirculated water is mixed with the new water makeup;
  ozonation of all or part of the recirculated water and of the new water makeup is carried out, a single ozonator being available for this purpose, which operates according to the following procedures:
    i) said ozonator produces a main flow of ozonated gas;
    j) a predetermined portion of the main flow of ozonated gas is diverted through a calibrated orifice, in order to direct it toward the recirculated water to be ozonated;
    k) the power of said ozonator is adjusted on the basis of the flow rate of new water to be ozonated.
  ozonation of all or part of the recirculated water and of the new water makeup is carried out, a single ozonator being available for this purpose, which operates according to the following procedures:
    i) said ozonator produces a main flow of ozonated gas;
    j) a predetermined portion of the main flow of ozonated gas is diverted through a calibrated orifice, in order to direct it toward the new water to be ozonated;
    k) the power of said ozonator is adjusted on the basis of the flow rate of recirculated water to be ozonated.

the fish farming treated in this way is closed circuit farming of seawater fish.

BRIEF DESCRIPTION OF THE FIGURES OF THE DRAWING

Other characteristics and advantages of the invention will emerge from the following description, given solely by way of illustration and in no way limiting, and made with reference to the appended drawings in which.

DETAILED DESCRIPTION OF THE PREFERRED EMBODIMENTS

Figure 1:
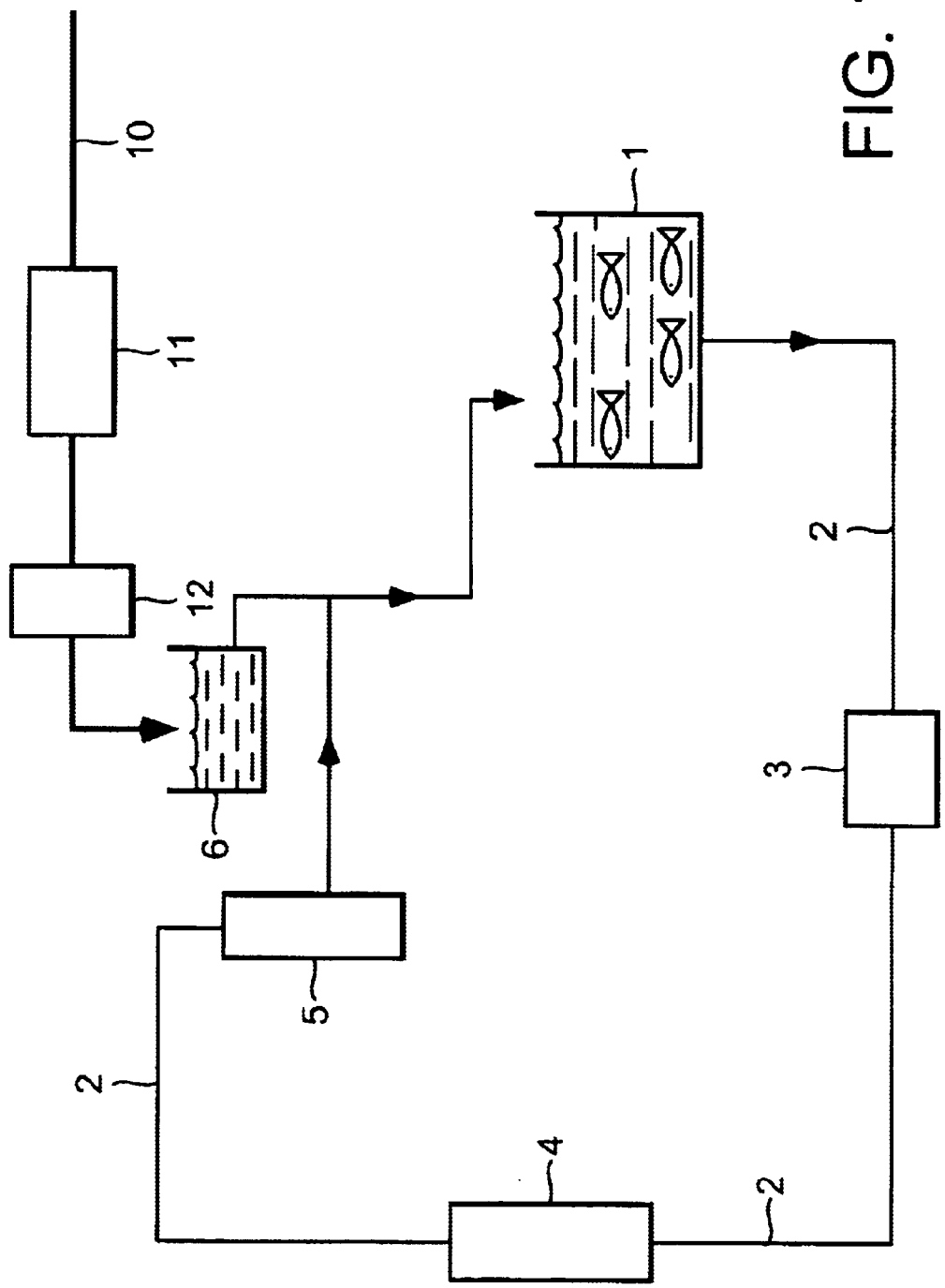
FIG. 1 is a schematic representation of an exemplary closed circuit seawater fish farming plant.

FIG. 1 illustrates the presence of a pond (1) for rearing fish, in this case, seawater fish (one rearing pond or of course one of the rearing ponds of the site in question), of which at least some of the seawater is recycled, via the recirculation line 2.

The seawater recirculated in this way undergoes in its path a number of purification steps, among which could be passage through a mechanical filter 3, passage through a biological filter 4 (nitrifying then denitrifying), together with a degassing column (5) making it possible especially to remove the carbon dioxide or even the dissolved nitrogen.

Moreover, note at the top of the figure a new water makeup (via the line 10 shown in the figure as a bold line), which passes for example, before reaching a retention tank 6, via a mechanical filtration step 11, and via a heat exchanger 12 in order to bring as required the new water makeup to the optimum temperature for the fish to grow.

The recirculated water coming from the column 5 is mixed with the new water coming from the retention tank 6, in order then to return to the pond 1.

Such a closed circuit may typically allow from 10 to 95% or even 98% of the seawater in the ponds in question to be recycled.

Figure 2:
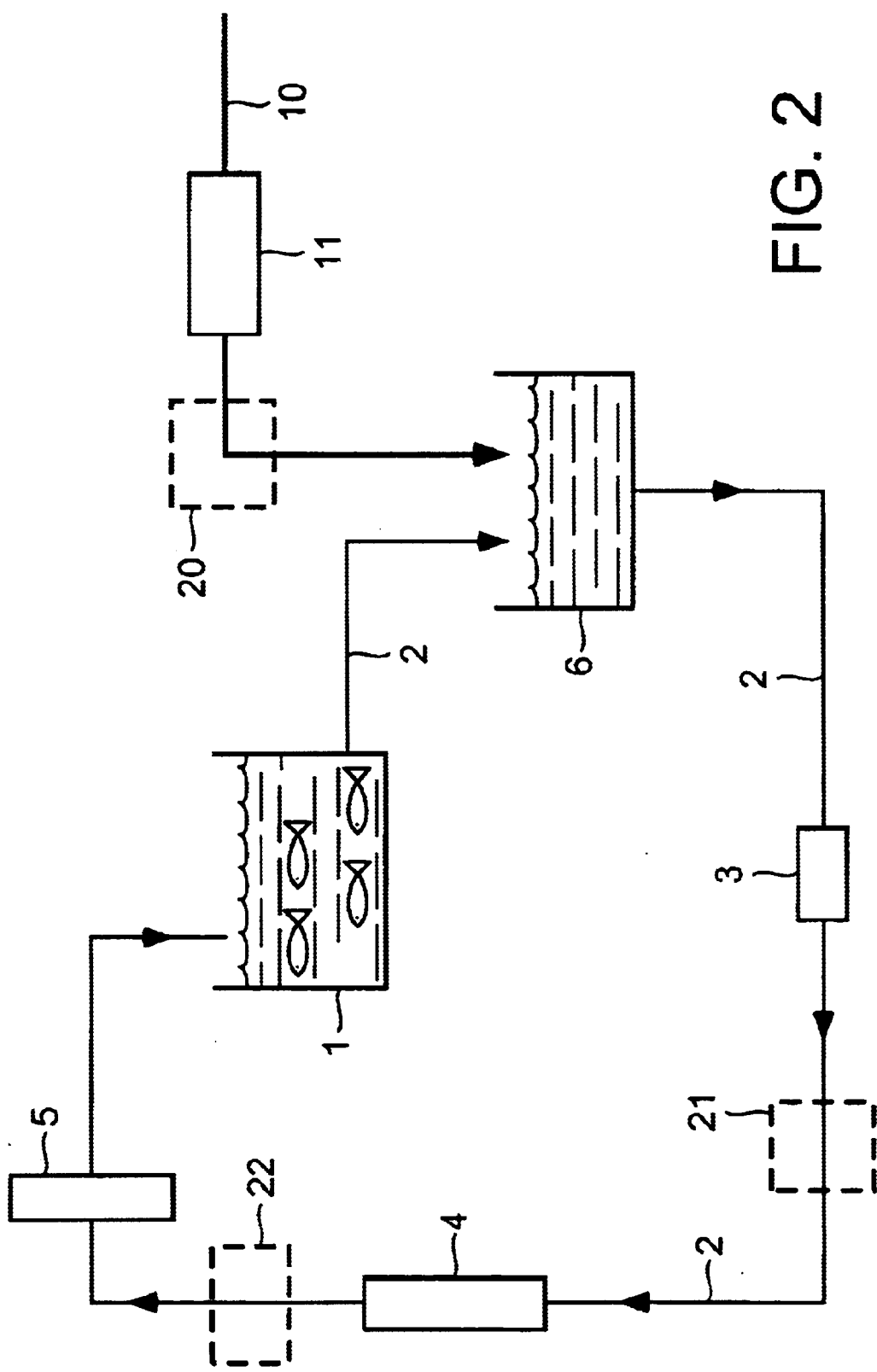
FIG. 2 is a schematic representation of another typical exemplary closed circuit seawater fish farming plant, used for the implementation of exemplary embodiments according to the invention as detailed below in the present application.

FIG. 2 shows a variant of a closed circuit fish farming plant, in this case also using seawater, in which the presence of a rearing tank 1 will be seen, from which at least part of the seawater is recycled to a retention tank 6, also fed moreover by new seawater makeup (line 10 shown here again as a bold line).

It is therefore here, within the scope of the present variant, that the seawater from the retention tank 6 which undergoes various purification steps including mechanical filtration 3, biological filtration 4, or even the degassing column 5, is mixed before being used in the pond 1.

On the lines, exemplary locations of ozonated gas injection according to the invention (20, 21, 22), have been shown, as rectangles drawn as dotted lines, on the new water makeup line downstream of the mechanical filtration system, and on the recycling line coming from the retention tank 6 upstream and downstream of the biological filter 4.

Figure 3:
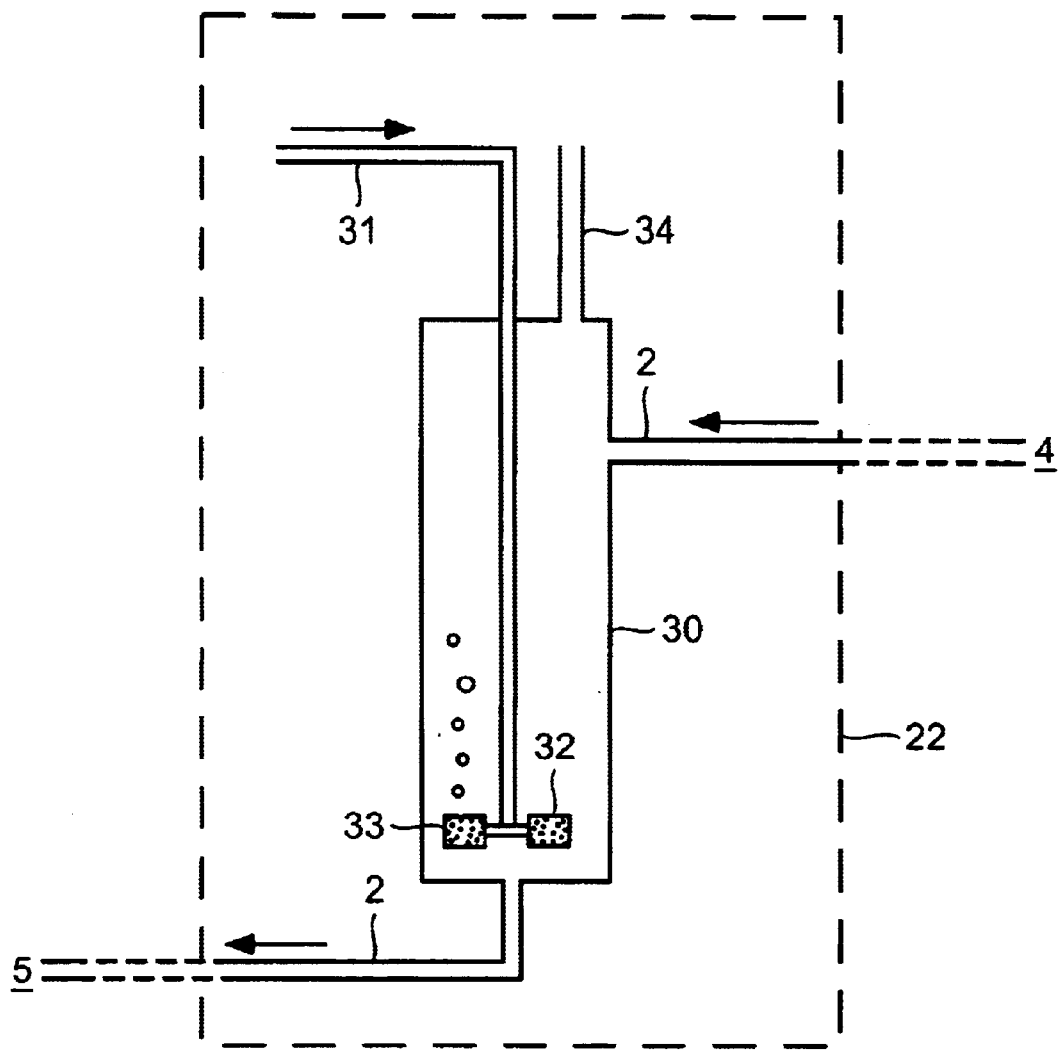
FIG. 3 is a partial schematic representation of an exemplary system allowing, for example, the ozonation of water recirculated in the loop.
Figure 4:
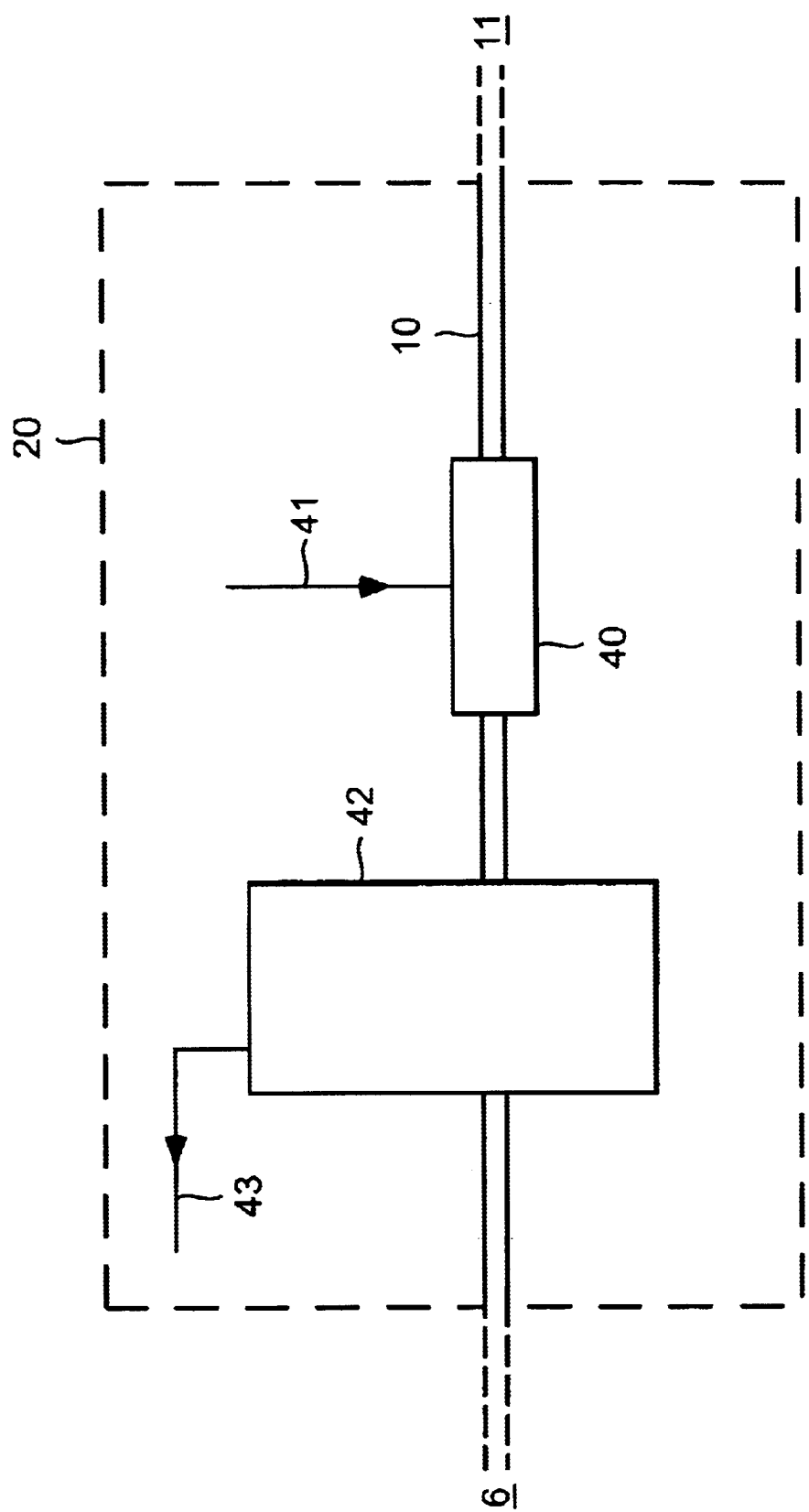
FIG. 4 is a partial representation of an exemplary system allowing the ozonation of the new water makeup.

FIGS. 3 and 4 specifically show two exemplary embodiments of the injection of ozonated gas into the water of the loop and into the new water makeup.

Thus FIG. 3 shows a possible embodiment of the injection of ozonated gas at the location 22, downstream of the biological filter 4, ozonation of the water of the closed circuit coming from the retention tank 6. Although in the following, the embodiment of FIG. 3 is preferred for ozonating the recirculated water and that of FIG. 4 for ozonating the new water, it is understood that this is technically completely interchangeable, and that therefore for example the system of FIG. 3 can also be used to ozonate the new water.

Thus in FIG. 3, the inflow of recirculated water from the biological filter 4 may be seen, opening out in the top part of an ozonation column 30, in the bottom of which there is a system for injecting ozonated gas into the water of the column (in this case two porous systems 32 and 33), which injection system is connected to a pipe 31 for the inflow of ozonated gas.

An air intake pipe 34 is present in the top of the column 30, while a pipe for removing ozonated water is provided at the bottom of the column in order to direct the water thus ozonated to the following step which happens to be, for the embodiment shown, the degassing column 5.

It is understood then that such an arrangement allowing a counterstream of ozonated gas bubbles and of the inflow of water from the closed circuit enables the water flow to be ozonated under simple and economical conditions, a structure that will be quite particularly favored in the case of relatively low ozonation rates, preferably below 1 ppm.

FIG. 4 provides another exemplary embodiment of the ozonation of a stream of water, typically suitable for the ozonation point 20 of FIG. 2 (ozonation of new water makeup), and the figure shows the pipe 10 for the inflow of new water makeup, coming from the filtration system 11, a stream of new water which encounters, in a mixer 40 (for example: coil, static mixer, contact tower, venturi-type hydroinjector, etc.), an inflow 41 of gas comprising ozone coming from an ozonator.

The stream of new water thus ozonated is then directed to a storage tank 42 ensuring a suitable contact time, and equipped in a conventional manner with a gas discharge system 43 (discharge to a conventional system for recovery, detoxification, etc.).

Of course it is then possible according to this embodiment to take water thus ozonated from the tank 42 in order to direct the water in this case to the retention tank 6, where it will be mixed with the recirculated water from the pond 1.

Figure 5:
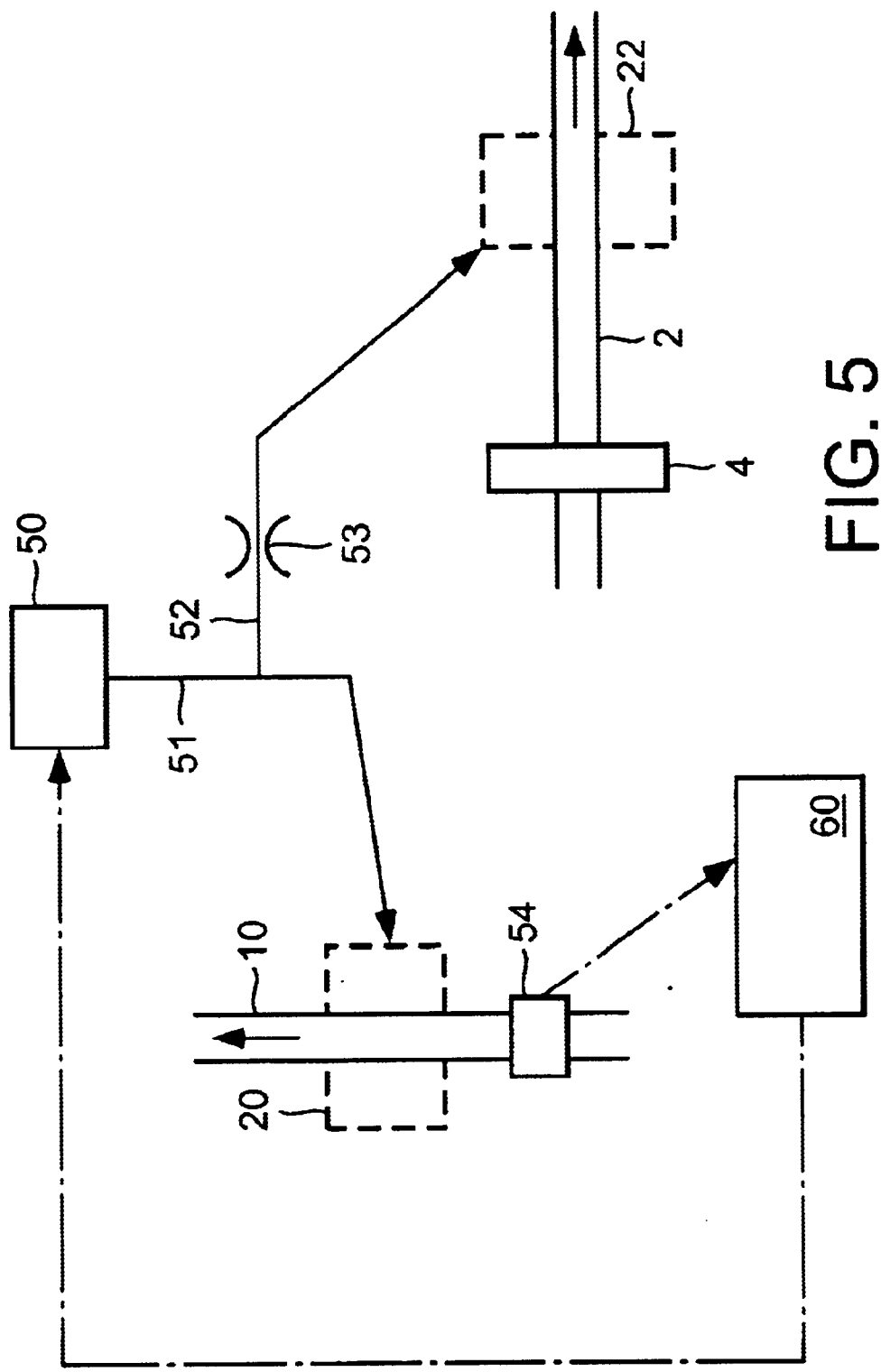
FIG. 5 is a schematic illustration of the case of a single ozonator used to ozonate both the recirculated water and the new water makeup.

As for FIG. 5, it illustrates a very advantageous embodiment of the invention, where both the new water makeup and the recirculated water are ozonated in the closed circuit, this by means of a single ozonator (reference 50 in the figure), the ozonator operating according to the following procedures:

FIG. 5 shows the new water makeup pipe 10 and its point 20 for injecting ozonated gas, the pipe 10 being, in this detailed view, equipped with a system 54 for measuring the water flow rate;

the pipe 2 for recirculating water coming from the retention tank 6, in this case detailed at the point of injection 22 of ozonated gas, is also shown;

in order to ozonate the two aforementioned locations of the circuit under satisfactory conditions, the single ozonator 50 therefore supplies (pipe 51), a main flow of ozonated gas, a predetermined portion of the flow of which is diverted (pipe branch 52) via a calibrated orifice 53 in order to direct this ozonated gas to the location 22 (closed circuit). The rest of the main flow of ozonated gas (line 51) is directed to the ozonation point 20 (new water);

a data acquisition and processing unit such as a programmable controller 60 then receives from the flow meter 54 information concerning the flow of new water to be treated in the pipe 10, and then retroacts according to this information in order to adjust the power of the ozonator 50 according to the variation in water flow in the pipe 10 (it is known that this flow of new water may in particular vary within a certain range depending on maintenance operations on filters and other pumps upstream);

it can then be seen that the unit 60 will, depending on the variation in new water flow rate in the pipe 10, vary the power of the ozonator 50, while the flow of ozonated gas in the pipe 51 is itself substantially constant, which will therefore vary the ozone content in this main flow of ozonated gas;

according to this embodiment, choosing to place a calibrated orifice (53) on the branch 52 will then give rise to the constant flow of ozonated gas to the point 22, the ozone content of which will however also vary within a predetermined range;

hence it can be seen that by a suitable adjustment of the power of the ozonator and of the calibrated orifice (53), it will be possible to deliver ozonated gas within the content range required by the user site to both the location 20 and to the location 22.

Such an arrangement (a single ozonator, calibrated orifice, etc.), therefore represents a structure which is light and very economical, but which supplies the required performance to the various points of the circuit, such as for example a content between 2 and 10 mg ozone/liter of new water to the point 20, and between 0.1 and 0.5 mg ozone/liter of recirculated water to the point 22.

A plant such as that shown within the scope of FIGS. 2 and 5 was used for examples of implementing the invention, under the following operating conditions:

consider a pond (1) for rearing seawater fish, operating with 30 to 100 m$^3$ of new water makeup, and a recirculation of about 1000 m$^3$/h water from pond 1;

an ozonation plant is used with a single ozonator as shown within the scope of FIG. 5, to set up the following ozone content, namely about 3 ppm ozone in the new water and a content close to 0.1 ppm in the water of the circuit at the point 22, that is to say downstream of the biological filter 4;

as indicated above, the ozonator will then see its power vary within a range of about 1.8 to 3.2 g ozone per m$^3$, while the ozone content in the line 52 will typically vary between 0.07 and 0.13 ppm;

the effect of such treatment on the quality of the water throughout, the circuit is then evaluated, firstly for the bacteria content per ml water and secondly, for the absorbance of the water at 400 nanometers (because of the yellow water phenomenon mentioned above);

it is of course understood that all these results are monitored with respect to a control pond operating normally in a closed circuit but without any inflow of ozonated gas according to the invention.

It is then possible to summarize the very spectacular results obtained by the following data:

a) it is noticed firstly, that the absorbance of the water is at least halved compared to the control pond, which perfectly confirms the everyday visual perception of the farmer with respect to the clarity of the water;

b) a reduction in the flowing bacterial content of the order of one log is obtained;

c) the farmer notices unquestionable efficiency of the ozone treatment according to the invention both on the decoloration of closed circuits and on the quality of the water in general, leading from his point of view even to an improvement in the biomass of fish compared with the control pond, in proportions which remain to be determined from tests in the longer term.

All these results are all the more spectacular and satisfactory since seawater is a complex and very reactive medium, which the ozone oxidizes nonselectively thereby forming oxidation byproducts which the literature calls "total residual oxidants", the nature of which has not been completely clarified but which are known to be toxic for fish when the presence of the oxidants is not adequately controlled.

Hence the fundamental importance of controlling, according to the invention, the water which is ozonated, the points of injecting ozonated gas, the latent and retention times and the dose rates, so as also to control the total residual oxidants. It will have been noted for example that the dose rates proposed for the new water makeup are substantially increased compared with the dose rates that the person skilled in the art of fish farming currently has in mind.

Although the present invention has been described in relation to particular embodiments, it is not limited thereby in any way, but is on the contrary capable of modifications and variants which will appear to the person skilled in the art within the scope of the claims below.

Thus, for example, although, according to one of the aspects of the invention, the ozonation of the new water flow has been mentioned above, it would be possible to ozonate only part of the new water flow reaching the ponds without departing at any time from the scope of the present invention.

What is claimed is:

1. A method for improving farming conditions in closed circuit fish farming, comprising:
   a) recycling at least part of the water of at least one rearing pond, said recycled water undergoing one or more purification treatments, before being reinjected into the pond in question;
   b) mixing the recycled water with new water makeup;
   c) ozonating at least part of the recycled water and ozonating at least part of the new water makeup before mixing it with the recycled water, wherein a single ozonator is present as the sole ozonator in the circuit and operates according to the following procedures:
      said ozonator produces a main flow of ozonated gas;
      a predetermined portion of the main flow of ozonated gas is directed to a calibrated orifice, in order to direct a constant flow toward the recycled water;
      the output of said ozonator being adjusted on the basis of the flow rate of the new water to be ozonated.

2. The method for improving farming conditions as claimed in claim 1, wherein the new water is ozonated to obtain an ozone content in the water of between 1 and 15 mg ozone/liter.

3. The method of claim 2, wherein the new water is ozonated to obtain an ozone content of between 2 and 10 mg ozone/liter of water.

4. The method for improving farming conditions as claimed in claim 2, wherein the recycling path includes a purification treatment using a biological filter, and the ozonated gas is then injected upstream of this biological filter.

5. The method for improving farming conditions as claimed in claim 2, wherein the recycling path includes a purification treatment using a biological filter, and the ozonated gas is then injected downstream of this biological filter, before the recirculated water is mixed with the new water makeup.

6. The method for improving farming conditions as claimed in claim 2, wherein the recycled water and the new water makeup are mixed in a retention tank.

7. The method for improving farming conditions as claimed in claim 2, wherein the fish farming improved in this way is closed circuit farming of seawater fish.

8. The method for improving farming conditions as claimed in claim 1, wherein the recirculated water is ozonated by to obtain an ozone content in the recirculated water of between 0.05 and 2 mg ozone/liter.

9. The method of claim 8, wherein the recirculated water is ozonated to obtain an ozone content between 0.1 and 0.5 mg ozone/liter of water.

10. The method for improving farming conditions as claimed in claim 1, wherein the recycling path includes a purification treatment using a biological filter, and the ozonated gas is then injected upstream of this biological filter.

11. The method for improving farming conditions as claimed in claim 1, wherein the recycling path includes a purification treatment using a biological filter, and the ozonated gas is then injected downstream of this biological filter, before the recirculated water is mixed with the new water makeup.

12. The method for improving farming conditions as claimed in claim 1, wherein the recycled water and the new water makeup are mixed in a retention tank.

13. The method for improving farming conditions as claimed in claim 1, wherein the fish farming improved in this way is closed circuit farming of seawater fish.

14. A method for decoloring the water of a closed circuit fish farm, which comprises:
   recycling at least part of the water of at least one rearing pond, subjecting said recycled water to one or more purification treatments before being reinjected into the pond in question, and mixing the recycled water with a new water makeup, wherein ozonation of at least part of the recycled water and ozonation of at least part of the new water makeup is carried out with a single ozonator present as the sole ozonator in the circuit and operating according to the following procedures:
      said ozonator produces a main flow of ozonated gas;
      a predetermined portion of the main flow of gas is directed through a calibrated orifice, in order to direct a constant flow toward the recycled water to be ozonated; and
      the output of said ozonator is adjusted on the basis of the flow rate of new water to be ozonated.

15. The decoloration method as claimed in claim 14, wherein the following ozonation dose rates are adopted:
   the new water makeup is ozonated to obtain an ozone content in the water of between 1 and 15 mg ozone/liter;
   the recirculated water is ozonated to obtain an ozone content in the recirculated water of between 0.05 and 2 mg ozone/liter.

16. The method of claim 15, wherein the new water is ozonated to an ozone content of between 2 and 10 mg ozone/liter of water and the recirculated water is ozonated to an ozone content between 0.1 and 0.5 mg/liter of water.

17. The decoloration method as claimed in claim 15, wherein the recycling path includes a purification treatment using a biological filter, and the ozonated gas is then injected upstream of this biological filter.

18. The decoloration method as claimed in claim 15, wherein the recycling path includes a purification treatment using a biological filter, and the ozonated gas is then injected downstream of this biological filter, before the recirculated water is mixed with the new water makeup.

19. The decoloration method as claimed in claim 15, wherein the mixing of the recycled water and the new water makeup is carried out in a retention tank.

20. The decoloration method as claimed in claim 15, wherein the fish farming treated in this way is closed circuit farming of seawater fish.

21. The decoloration method as claimed in claim 14, wherein the recycling path includes a purification treatment using a biological filter, and the ozonated gas is then injected upstream of this biological filter.

22. The decoloration method as claimed in claim 14, wherein the recycling path includes a purification treatment using a biological filter, and the ozonated gas is then injected downstream of this biological filter, before the recirculated water is mixed with the new water makeup.

23. The decoloration method as claimed in claim 14, wherein the mixing of the recycled water and the new water makeup is carried out in a retention tank.

24. The decoloration method as claimed in claim 14, wherein the fish farming treated in this way is closed circuit farming of seawater fish.

25. A plant for decoloring the water of a closed circuit fish farm, which comprises means for recycling at least part of the water of at least one rearing pond, means for purifying the recycled water before its reuse in the pond in question, new water makeup means for addition to the stream of recycled water, means for ozonating at least part of the recycled water and at least part of the new water makeup before it is mixed with the recycled water, said means for ozonating comprising:
  a single ozonator as the sole ozonator in the circuit and capable of supplying a main flow of ozonated gas;
  a line for directing a predetermined portion of the main flow of ozonated gas produced by the ozonator, through a calibrated orifice, in order to direct a constant flow toward the recycled water to be ozonated;
  means for measuring the flow rate of new water to be ozonated; and
  means for adjusting the output of said ozonator on the basis of the flow rate of the new water measured by said measuring means.

26. The plant as claimed in claim 25, wherein the fish farm treated in this way is a closed circuit farm for seawater fish.

27. A method for improving farming conditions in closed circuit fish farming, comprising:
  a) recycling at least part of the water of at least one rearing pond, said recycled water undergoing one or more purification treatments, before being reinjected into the pond in question;
  b) mixing the recycled water with new water makeup;
  c) ozonating at least part of the recycled water and ozonating at least part of the new water makeup before mixing it with the recycled water, wherein a single ozonator is present as the sole ozonator in the circuit and operates according to the following procedures:
    said ozonator produces a main flow of ozonated gas;
    a predetermined portion of the main flow of ozonated gas is directed to a calibrated orifice, in order to direct a constant flow toward the new water to be ozonated;
    the output of said ozonator being adjusted on the basis of the flow rate of the recycled water to be ozonated.

28. The method for improving farming conditions as claimed in claim 27, wherein the new water is ozonated to an ozone content in the water of between 1 and 15 mg ozone/liter and the recirculated water is ozonated to an ozone content in the recirculated water of between 0.05 and 2 mg ozone/liter.

29. The method of claim 28, wherein the new water is ozonated to an ozone content between 2 and 10 mg ozone/liter of water and the recirculated water is ozonated to an ozone content between 0.1 and 0.5 mg ozone/liter of water.

30. The method for improving farming conditions as claimed in claim 28, wherein the recycling path includes a purification treatment using a biological filter, and the ozonated gas is then injected upstream of this biological filter.

31. The method for improving farming conditions as claimed in claim 28, wherein the recycling path includes a purification treatment using a biological filter, and the ozonated gas is then injected downstream of this biological filter, before the recirculated water is mixed with the new water makeup.

32. The method for improving farming conditions as claimed in claim 28, wherein the recycled water and the new water makeup are mixed in the retention tank.

33. The method for improving farming conditions as claimed in claim 28, wherein the fish farming improved in this way is closed circuit farming of seawater fish.

34. The method for improving farming conditions as claimed in claim 27, wherein the recycling path includes a purification treatment using a biological filter, and the ozonated gas is then injected upstream of this biological filter.

35. The method for improving farming conditions as claimed in claim 27, wherein the recycling path includes a purification treatment using a biological filter, and the ozonated gas is then injected downstream of this biological filter, before the recirculated water is mixed with the new water makeup.

36. The method for improving farming conditions as claimed in claim 27, wherein the recycled water and the new water makeup are mixed in a retention tank.

37. The method for improving farming conditions as claimed in claim 27, wherein the fish farming improved in this way is closed circuit farming of seawater fish.

38. A method for decoloring the water of a closed circuit fish farm, which comprises:
  recycling at least part of the water of at least one rearing pond, subjecting said recycled water to one or more purification treatments before being reinjected into the pond in question, and mixing the recycled water with a new water makeup, wherein ozonation of at least part of the recycled water and ozonation of at least part of the new water makeup is carried out with a single ozonator present as the sole ozonator in the circuit and operating according to the following procedures:
    said ozonator produces a main flow of ozonated gas;
    a predetermined portion of the main flow of gas is directed through a calibrated orifice, in order to direct a constant flow toward the new water to be ozonated; and
    the output of said ozonator is adjusted on the basis of the flow rate of recycled water to be ozonated.

39. The decoloration method as claimed in claim 38, wherein the following ozonation dose rates are adopted:
- the new water makeup is ozonated to obtain an ozone content in the water of between 1 and 15 mg ozone/liter;
- the recirculated water is ozonated to obtain an ozone content in the recirculated water of between 0.05 and 2 mg ozone/liter.

40. The method of claim 39, wherein the new water is ozonated to an ozone content of between 2 and 10 mg ozone/liter of water and the recirculated water is ozonated to an ozone content between 0.1 and 0.5 mg/liter of water.

41. The decoloration method as claimed in claim 39, wherein the recycling path includes a purification treatment using a biological filter, and the ozonated gas is then injected upstream of this biological filter.

42. The decoloration method as claimed in claim 39, wherein the recycling path includes a purification treatment using a biological filter, and the ozonated gas is then injected downstream of this biological filter, before the recirculated water is mixed with the new water makeup.

43. The decoloration method as claimed in claim 39, wherein the mixing of the recycled water and the new water makeup is carried out in a retention tank.

44. The decoloration method as claimed in claim 39, wherein the fish farming treated in this way is closed circuit farming of seawater fish.

45. The decoloration method as claimed in claim 38, wherein the recycling path includes a purification treatment using a biological filter, and the ozonated gas is then injected upstream of this biological filter.

46. The decoloration method as claimed in claim 38, wherein the recycling path includes a purification treatment using a biological filter, and the ozonated gas is then injected downstream of this biological filter, before the recirculated water is mixed with the new water makeup.

47. The decoloration method as claimed in claim 38, wherein the mixing of the recycled water and the new water makeup is carried out in a retention tank.

48. The decoloration method as claimed in claim 38, wherein the fish farming treated in this way is closed circuit farming of seawater fish.

49. A plant for decoloring the water of a closed circuit fish farm, which comprises means for recycling at least part of the water of at least one rearing pond, means for purifying the recycled water before its reuse in the pond in question, new water makeup means for addition to the stream of recycled water, means for ozonating at least part of the recycled water and at least part of the new water makeup before it is mixed with the recycled water, said means for ozonating comprising:
- a single ozonator as the sole ozonator in the circuit and capable of supplying a main flow of ozonated gas;
- a line for directing a predetermined portion of the main flow of ozonated gas produced by the ozonator, through a calibrated orifice, in order to direct a constant flow toward the new water to be ozonated;
- means for measuring the flow rate of recycled water to be ozonated; and
- means for adjusting the output of said ozonator on the basis of the flow rate of the recycled water measured by said measuring means.

50. The plant as claimed in claim 49, wherein the fish farm treated in this way is a closed circuit farm for seawater fish.

* * * * *